Oct. 30, 1956   F. J. LANGEMACK   2,768,581
FLUENT MATERIAL DISPENSER
Filed April 19, 1954   2 Sheets-Sheet 1
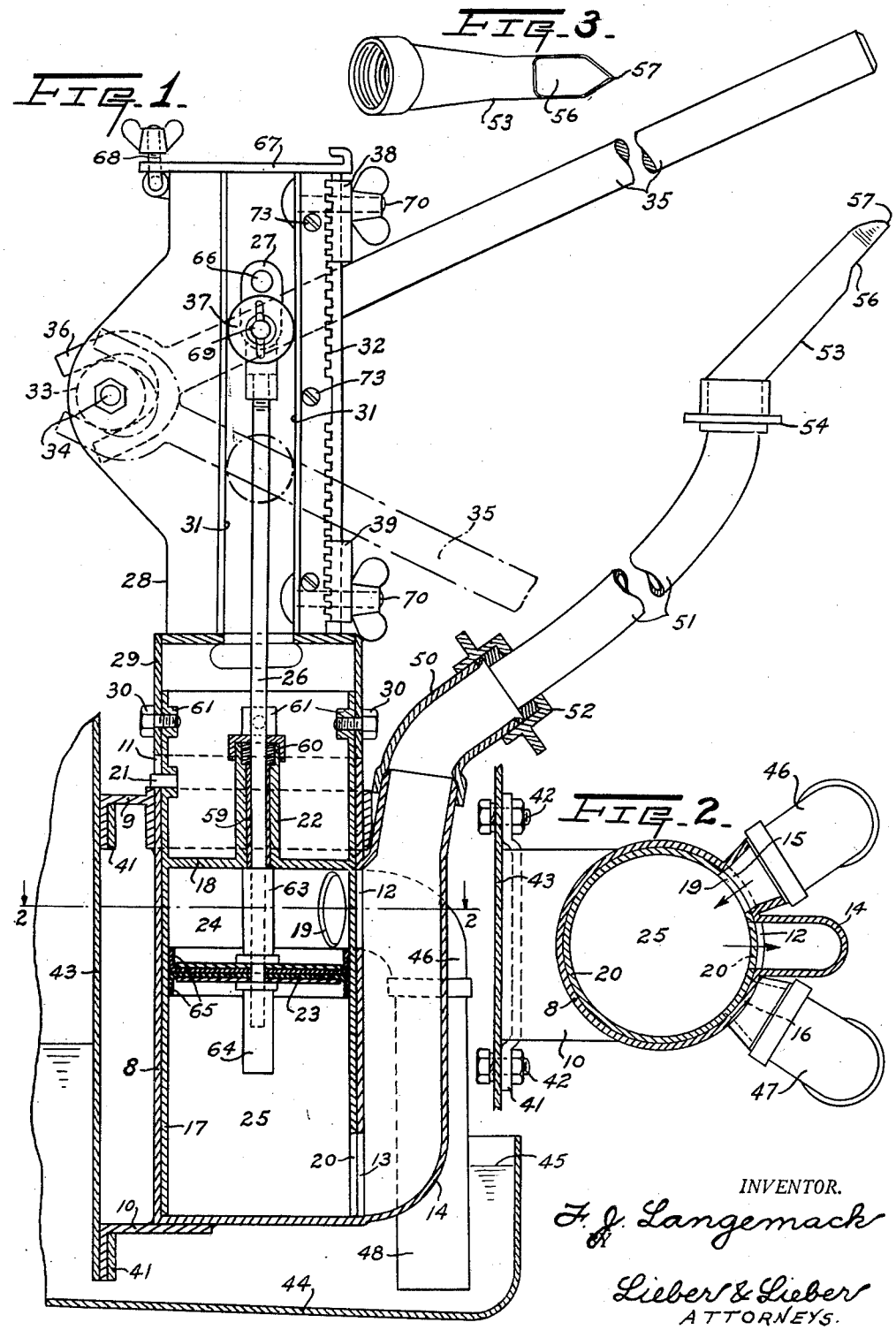
INVENTOR.
F. J. Langemack
Lieber & Lieber
ATTORNEYS.

Oct. 30, 1956   F. J. LANGEMACK   2,768,581
FLUENT MATERIAL DISPENSER
Filed April 19, 1954   2 Sheets-Sheet 2
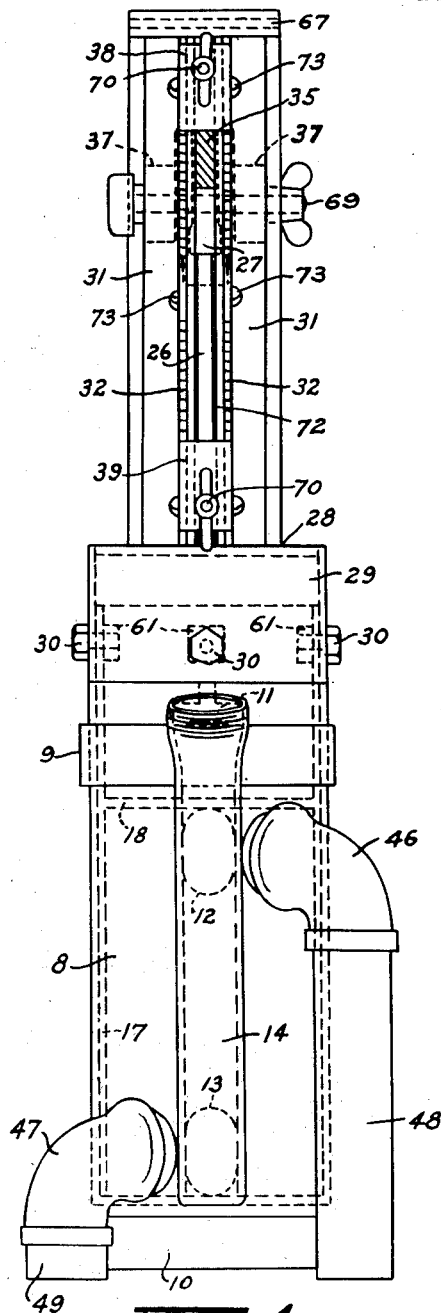
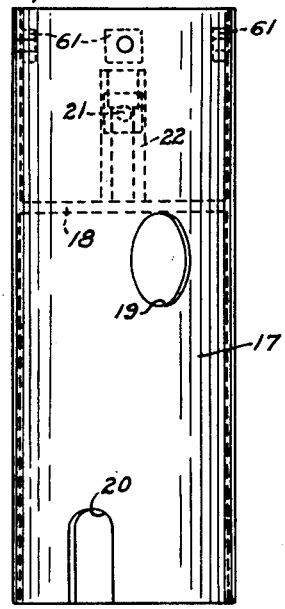
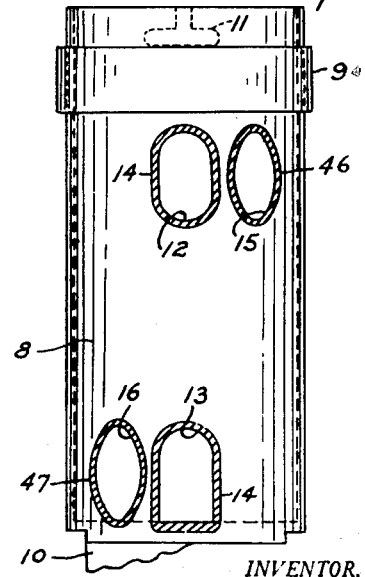
INVENTOR.
F. J. Langemack
Lieber & Lieber
ATTORNEYS.

United States Patent Office 2,768,581
Patented Oct. 30, 1956

2,768,581

FLUENT MATERIAL DISPENSER

Franklyn J. Langemack, Milwaukee, Wis.

Application April 19, 1954, Serial No. 424,067

10 Claims. (Cl. 103—38)

The present invention relates in general to improvements in the art of dispensing fluent substances such as liquids or semi-liquids in regulated quantities, and relates more specifically to improvements in the construction and operation of structure for effectively feeding such fluent materials from a source of supply to places of utilization.

The primary object of my invention is to provide an improved fluent material dispensing device which is simple in construction and highly reliable and efficient in operation.

When feeding fur-bearing domesticated animals such as mink with liquid or semi-fluent foods such as mash and materials containing solids like bone fragments, it is very desirable to deliver regulated quantities of the food to each feeding pen especially during seasonal changes when the animals require variable amounts of feed. In warm weather it is also desirable to dispense the food in sanitary condition and as rapidly as possible in order to prevent possible spoilage and detrimental bacterial action, and the proper feeding should also be capable of being accomplished by inexperienced help and without danger of having the animals escape.

Heretofore, it has been universal practice to either use a spoon or ladle to dish approximate quantities of such foods from a tank or bucket into the individual feed pans, or to use an ordinary hand pump devoid of accurate quantity control means, and these prior methods besides being exceedingly slow and tedious could not be utilized to effect scientific feeding of diverse kinds of fur-bearing animals in accordance with seasonal requirements. The prior methods also resulted in considerable waste of feed unless accomplished by experienced attendants, and therefore required experts to properly dole out proper quantities of different types of the food. Then too, the former feeding methods were very unsanitary and conducive to objectionable bacterial growth, and could not be conveniently carried on at requisite high speed.

It is therefore an important object of the present invention to provide improved mechanism especially adapted for the purpose of batch feeding animals, and which is conveniently operable so as to insure proper and accurate delivery of liquid and semi-liquid foods.

Another important object of this invention is to provide an improved fluent material feeder which is readily manipulatable by a novice to rapidly deliver successive batches of the material to feed pans or the like without danger or waste of feed.

A further importatn object of the invention is to provide a simple, compact and easily operable unit for transferring accurately measured batches of fluent material such as food, from a source of supply to remote localities where the food is to be consumed.

Still another important object of my invention is to provide an improved mechanical dispenser for fluent food, which may be quickly and conveniently dismantled for cleaning purposes, and just as readily reassembled for normal use, and which may be easily adjusted to vary its functioning.

An additional important object of the present invention is to provide a batch feeding device for confined animals such as mink, which can be safely and rapidly actuated without danger of having the penned animals escape, and which may also be transported so as to insure fast feeding of numerous individual animals in accord with their seasonal requirements.

Another important object of the invention is to provide a scientific animal feeder of durable and relatively inexpensive construction, which is extremely flexible in its adaptions while being operable and adjustable with minimum exertion on the part of the user.

A further important object of this invention is to provide a relatively silent feeding mechanism for shy animals, which will avoid scaring the food recipients, and wherein all parts are conveniently accessible for inspection, adjustment and manipulation.

These and other more specific objects and advantages of the present invention will be apparent from the following detailed description, from which it will be noted that the gist of my improvement is the provision of a mechanical fluid feeder of compact size but of large capacity embodying outer and inner relatively rotatable coaxial cylinders which are divided by a reciprocable plunger into segregated displacement chambers and are provided with ports and communicable openings adapted to continuously transfer successive batches of fluent material from a source of supply through a delivery nozzle when the plunger is being reciprocated and the cylinders are relatively oscillated in opposite directions about their common axis at the end of each stroke of the plunger.

A clear conception of the features constituting my invention and of the construction and operation of a commercial fluent material feeding unit embodying the same, may be had by referring to the drawings accompanying and forming a part of this specification wherein like reference characters designate the same or similar parts in the various views.

Fig. 1 is a part sectional side view of one of the improved fluent material feeders, showing the same mounted upon a fragment of a material supply receptacle, and the section having been taken longitudinally and centrally through the coaxial measuring cylinders and through the displacement plunger which is reciprocable therein and is shown in its uppermost position;

Fig. 2 is a transverse section through the cylinders and a fragment of their suspension wall, taken along the line 2—2 of Fig. 1;

Fig. 3 is a bottom view of the special fluent material delivery nozzle preferably used with the improved feeding unit;

Fig. 4 is a front view of the fluent material feeder shown in Fig. 1, with the actuating handle broken away and the material delivery tube and nozzle also omitted;

Fig. 5 is a front view of the inner cylinder alone, showing the fluent material passages or openings therein; and Fig. 6 is a front view of the outer cylinder alone, but with the conduits for admitting and discharging the fluent material, broken away close to the cylinder in order to clearly show the inlet and outlet ports therein.

While the invention has been shown and described herein as having been embodied in a feeder especially adapted to deliver food to mink or similar fur bearing animals, it is not the intent to unnecessarily limit the improvements to such particular use; and it is also contemplated that specific descriptive terms employed herein be given the broadest possible interpretation consistent with the actual disclosure.

Referring to the drawings, the fluent material dispensing unit shown therein, comprises in general, an outer cylinder 8 having a closed bottom and an open top and being provided with rear upper and lower suspension hooks 9, 10 and with an inverted T-slot 11, and with front upper and lower vertically alined outer ports 12, 13 communicating with a discharge duct 14 and with upper and lower vertically off-set inlet ports 15, 16 respectively; an inner cylinder 17 rotatable within and resting upon the bottom of the outer cylinder 8 and having open upper and lower ends but being provided with a medial transverse partition 18 and with vertically staggered upper and lower front openings 19, 20, the cylinder 17 also having a rear pin 21 coacting with the slot 11 and a central bearing sleeve 22 projecting upwardly from the partition 18; a plunger 23 reciprocable within the inner cylinder 17 and dividing the space beneath the partition 18 into upper and lower displacement chambers 24, 25 respectively, the plunger having an actuating rod 26 extending upwardly through the sleeve 22 and provided with a clevis 27 at its upper extremity; a bracket 28 having a cylindrical base 29 surrounding and rigidly secured to the inner cylinder 17 by cap screws 30 and being provided with spaced upright guideways 31 and with spaced racks 32 in front of these guideways and with a fulcrum roller 33 mounted upon a pivot pin 34 at the rear of the guideways 31; a manipulating lever or handle 35 having a forked end 36 cooperable with the fulcrum roller 33 and being provided at its medial portion with rollers 37 movable along the spaced guideways 31; and upper and lower stop blocks 38, 39 respectively for the lever handle 35, adjustably associated with the racks 32.

As illustrated in Figs. 1 and 2, the outer cylinder 8 is suspended by its rear hooks 9, 10 from mounting bars 41 secured by bolts 42 to an upright wall 43 of a food receptacle having its lower front portion 44 projecting forwardly beneath the bottom of the dispensing unit, and this receptacle may be mounted upon a transporting truck or cart and should normally be supplied with an abundance of liquid or semi-liquid fluent food 45. The hooks 9, 10 and the discharge duct 14 may be welded or otherwise rigidly secured to the outer cylinder 8 so that this cylinder is fixed against rotation; and the cylinder 8 is also provided with rigidly attached upper and lower elbow conduits 46, 47 at the ports 15, 16 respectively, and which communicate through pipes 48, 49 with the front portion 44 of the food supply receptacle close to its bottom whereby no air can enter these pipes during normal operation. The upper outlet end of the duct 14 is provided with a freely rotatable elbow 50 which is connected to one end of a food dispensing hose 51 by means of a quickly detachable coupling 52 and a fluent material dispensing nozzle 53 is likewise connected to the opposite end of the flexible hose 51 by means of a similar coupling 54 so that the hose may be swung laterally of the unit and disconnected for cleaning.

The food delivery nozzle 53 is preferably of special construction as shown in Figs. 1 and 3, in order to permit the same to be readily inserted through the wire mesh pens or cages which house the animals, and to also eliminate excess dripping and waste of the food product when the nozzle is inserted and removed from the feed pans. This nozzle 53 diverges from its inlet end toward the outlet opening 56 at its opposite end, and this opening 56 is normally disposed below the nozzle axis and has a V-shaped end or snout 57 at its outermost extremity as depicted in Fig. 3. With this construction, the nozzle 53 can be readily inserted through the pen cage with the snout 57 pointing downwardly into the feed pan, and the fluent food can be delivered into the pan silently and without splashing. After sufficient food has been discharged, the nozzle 53 can be quickly withdrawn from the cage while the snout 57 effectively prevents waste of food due to dripping.

The inner cylinder 17 which is oscillatable within the outer cylinder 8 about the common central axis of these cylinders within the limits defined by the opposite ends of the slot 11, is prevented from being displaced longitudinally of the outer cylinder by the pin 21 except when this pin is disposed midway between the slot ends, and this pin and slot may obviously be reversed if desired. The partition 18 may be welded or otherwise firmly secured to the outer wall of the cylinder 17 and the sleeve 22 may be likewise secured to the partition 18 and is provided with a bearing bushing 59 within which the plunger rod 26 is reciprocable. A packing gland 60 is also provided at the upper end of the sleeve 22 and bushing 59, and the cap screws 30 which attach the bracket base 29 to the inner cylinder 17 coact with lugs 61 welded or otherwise secured to the interior of this cylinder. The openings 19, 20 formed in the cylinder 17 below the partition 18 are staggered as shown in Fig. 5, and are so located that when this rotary cylinder is oscillated to its extreme position in one direction the inner cylinder upper opening 19 will register with the upper outer cylinder inlet port 15, whereas oscillation of the inner cylinder 17 to its extreme position in the opposite direction will cause the lower opening 20 to register with the lower outer cylinder inlet port 16. The location of these upper and lower openings in the inner cylinder 17 is also such, that when the upper opening 19 is brought into registry with the upper port 15 the lower opening 20 will register with the lower central port 13, and when the lower opening 20 is brought into registry with the lower port 16 the upper opening 19 will register with the upper central port 12.

The vertically reciprocable plunger 23 which separates the upper and lower displacement chambers 24, 25 is provided with upper and lower stops 63, 64 adapted to engage the partition 18 and the bottom of the outer cylinder respectively, so as to prevent the plunger from traveling beyond the openings 19, 20. The piston or plunger 23 is also preferably provided with a pair of opposed cup-leather seals 65 for positively sealing the displacement chambers 24, 25 from each other, and the plunger actuating rod 26 may be reciprocated either manually with the aid of the lever handle 35 or by means of a hydraulic servomotor applied to an upper opening 66 in the clevis 27 and which may be secured to an upper plate 67 on the bracket 28 by means of a clamp 68. The lower portion of the plunger rod 26 is guided for longitudinal movement by the bushing 59, while the upper portion of this rod is guided by the rollers 37 which are mounted upon a removable shaft 69 passing through the clevis 27 and through the medial portion of the lever handle 35.

As previously indicated, the bracket 28 has its base 29 rigidly but detachably secured to the upper extremity of the inner cylinder 17 by means of the cap screws 30 so that the lever handle 35 may be utilized to simultaneously oscillate the bracket 28 and the inner cylinder 17 about the common axis of the cylinders 8, 17, and this lever handle or any other means may also be operated to reciprocate the piston 23 without longitudinally displacing the cylinders 8, 17. The upright guides 31 of the bracket 28 are so spaced that the rollers 37 carried by the medial portion of the handle 35 will travel freely therealong when the handle is oscillated vertically, and this lever handle 35 is also freely slidable between the two sets of guides 31 when its forked end 36 swings about the pivot pin 34 which is fixedly mounted in the bracket 28. The roller 33 is provided merely in order to provide a large bearing for the forked end 36 of the handle and to facilitate application of the handle to its fulcrum, and this roller 33 may rotate upon the pin 34 or the handle may oscillate relative to the roller.

The stroke of the piston 23 may be readily varied by adjusting the stop blocks 38, 39 to different positions along the rack 32. Each of the blocks 38, 39 is provided with a series of teeth adapted to engage the teeth of the rack 32 as shown in Fig. 1, and the blocks 38, 39 can be firmly held in various positions of adjustment by means of wing nuts and bolts 70 which are movable along the space 72 between the adjacent guides 31 as illustrated in Fig. 4. The rack 32 is formed of two spaced parts which are secured to the bracket 28 by screws 73 and the space 72 is located between these parts of the rack. By merely releasing the thumb nuts, the blocks 38, 39 may obviously be associated with the rack 32 at various locations so as to vary the stroke of the handle 35 and of the pump plunger 23; and the stops 63, 64 will function to limit the movement of the plunger 23 beyond the openings 19, 20 when the blocks 38, 39 are taken off.

When the improved fluent material dispenser has been properly constructed and assembled as shown and described, and the supply reservoir has been provided with fluent material 45, the lever handle 35 may be swung vertically to reciprocate the piston 23 and it may also be swung laterally or horizontally to oscillate the inner cylinder 17 in opposite directions at each end of the piston reciprocation stroke. As shown in Fig. 1, the piston 23 is in its uppermost position and the upper displacement chamber 24 is in open communication with the supply reservoir through the opening 19, port 15 and pipe 48, while the lower displacement chamber 25 has been filled to its maximum extent with material 45 and is in open communication with the discharge hose 51 through the opening 20, port 13, duct 14 and elbow 50.

If the handle 35 is swung downwardly from the position shown in solid lines to lower the plunger 23, material will be forced from the lower chamber 25 into the hose 51 and through the nozzle, until the downward stroke of the plunger 23 is arrested by the lower stop 64. This downward movement of the plunger 23 will simultaneously cause fluent material 45 to be withdrawn from the supply source and to fill the upper displacement chamber 24 to its maximum extent, and after the handle has been depressed as far as possible as shown in dot-and-dash lines, it may be swung laterally to cause the food laden upper displacement chamber 24 to be brought into open communication with the discharge hose 51 through the opening 19, port 12, duct 14 and elbow 50, and to simultaneously cause the lower chamber 25 to be brought into open communication with the supply source through the opening 20, port 16 and pipe 49.

The handle 35 may thereafter be elevated to force material 45 from within the upper chamber 24 into the hose 51 and through the nozzle 53, and when the upper end of the plunger stroke has been reached, the handle may again be swung laterally in the opposite direction so as to restore the cylinders 8, 17 to the starting position shown in Figs. 1 and 2. The handle 35 may thus be manipulated to cause a continuous stream of the fluent material 45 to be withdrawn from the supply reservoir and to be delivered through the hose 51 to the nozzle 53, if so desired, but ordinarily only a single stroke is required to feed the proper amount of material 45, except when the mother has her young with her. The quantity of the fluent material fed at each stroke of the plunger 23, may however be readily varied by merely adjusting the stop blocks 38, 39 toward or away from each other, along the rack 32, with the aid of the bolts 70, thus providing for accurate feeding of the animals in accordance with their seasonal requirements.

When it becomes desirable to dismantle the unit for inspection and cleaning purposes, it is only necessary to swing the handle 35 laterally into mid-position, and to thereafter lift the pin 21 of the inner cylinder 17 out of the vertical portion of the inverted T-slot 11 of the outer cylinder 8. The shaft 69 may then be removed to permit free removal of the handle 35 from the fulcrum roller 33, and of the plunger 23 from within the inner cylinder 17; and the unit may also be lifted bodily from its supporting bars 41 on the tank wall 43 so as to permit thorough cleaning of all parts thereof. The mechanism may be just as conveniently re-assembled, and the piston packings 65 and the packing gland 60 prevent escape of fluent material from one chamber 24, or 25 into the other, and from the upper chamber 24 to the ambient atmosphere.

From the foregoing detailed description of the construction and operation of the improved fluent material dispenser, it will be apparent that the invention in fact provides a unit which is adapted to insure proper and accurate feeding of liquid and semi-liquid food or the like, in variable selected quantities and without waste. The delivery of the measured batches may be either continuous or intermittent and may be effected at high speed either manually or with the aid of a hydraulic servo-motor applied to the upper mounting plate 67. The unit may be safely operated by a novice without necessity of opening the doors of the animal confining pens, with the aid of the improved nozzle 53; and can be readily transported on a truck or cart but may also be easily carried because of its compactness. The mechanism is moreover noiseless in operation and may be readily maintained in sanitary condition, and it has proven highly successful and satisfactory in actual commercial use.

It should be understood that it is not desired to limit this invention to the exact details of construction or to the precise mode of operation of the dispensing unit specifically shown and described herein, for various modifications within the scope of the appended claims may occur to persons skilled in the art.

I claim:

1. A fluid feeder comprising, outer and inner relatively rotatable coaxial cylinders, a reciprocable plunger dividing said cylinders into segregated displacement chambers, said outer cylinder having inlet ports near its opposite ends disposed in different planes radiating from the cylinder axis and also having opposite end discharge ports disposed in an intervening radial plane, and said inner cylinder having openings near its opposite ends adapted to alternately connect the ports at the corresponding ends of the outer cylinder with each other through the adjacent displacement chambers, and means for reciprocating said plunger and for relatively rotating said cylinders at the end of each stroke of the plunger.

2. A fluid feeder comprising, outer and inner relatively rotatable coaxial cylinders, a reciprocable plunger dividing said cylinders into segregated displacement chambers, said outer cylinder having inlet ports near its opposite ends disposed in different planes radiating from the cylinder axis and also having opposite end discharge ports disposed in an intervening radial plane, and said inner cylinder having openings near its opposite ends adapted to alternately connect the ports at the corresponding ends of the outer cylinder with each other through the adjacent displacement chambers, and means for effecting reciprocation of said plunger and relative oscillation of said cylinders about said cylinder axis at the end of each stroke of the plunger.

3. A fluid feeder comprising, outer and inner relatively rotatable coaxial cylinders, a reciprocable plunger dividing said cylinders into segregated displacement chambers, said outer cylinder having inlet ports near its opposite ends disposed in different planes radiating from the cylinder axis and also having opposite end discharge ports disposed in an intervening radial plane, and said inner cylinder having openings near its opposite ends adapted to alternately connect the ports at the corresponding ends of the outer cylinder with each other through the adjacent displacement chambers, means for reciprocating said plunger and for relatively rotating said cylinders at the end of each stroke of the plunger, and means for varying the stroke of the plunger.

4. A fluid feeder comprising, outer and inner relatively rotatable coaxial cylinders, a reciprocable plunger dividing said cylinders into segregated displacement chambers, said outer cylinder having an inlet and an outlet port at each of its opposite ends and said inner cylinder having openings near its opposite ends adapted to alternately connect the ports at the corresponding ends of the outer cylinder with each other through the adjacent displacement chambers, and means for reciprocating said plunger and for relatively rotating said cylinders near the end of each stroke of the plunger.

5. A fluid feeder comprising, outer and inner relatively rotatable coaxial cylinders, a reciprocable plunger dividing said cylinders into segregated displacement chambers, said outer cylinder having an inlet and an outlet port at each of its opposite ends and said inner cylinder having openings near its opposite ends adapted to alternately connect the ports at the corresponding ends of the outer cylinder with each other through the adjacent displacement chambers, common means for effecting reciprocation of said plunger and relative oscillation of said cylinders about said cylinder axis near the end of each stroke of the plunger, and means for effecting variation in the stroke of said plunger.

6. A fluid feeder comprising, outer and inner relatively rotatable coaxial cylinders, a reciprocable plunger dividing said cylinders into segregated displacement chambers, said outer cylinder having an inlet and an outlet port at each of its opposite ends and said inner cylinder having openings near its opposite ends adapted to alternately connect the inlet and outlet ports at the corresponding opposite ends of the outer cylinder with each other through the adjacent displacement chambers, a lever handle for reciprocating said plunger and for rotating said inner cylinder relatively to said outer cylinder at the end of each stroke of the plunger, and adjustable stops coacting with said handle to vary the stroke of the plunger.

7. In a fluid dispenser, outer and inner coaxial and relatively rotatable cylinders normally fixed against relative longitudinal displacement, one of said cylinders having fluid conducting ports at its opposite ends and the other having opposite end openings for alternately opening the adjacent cylinder end ports, a plunger reciprocable within said inner cylinder and dividing the same into opposed displacement chambers, and means for reciprocating said plunger to draw fluent material into one of said chambers while discharging such material from the other during each stroke of the plunger and for relatively rotating said cylinders about their common axis at the end of each plunger stroke to reverse the plunger action during each succeeding stroke.

8. In a fluid dispenser, outer and inner coaxial and relatively rotatable cylinders normally fixed against relative longitudinal displacement, one of said cylinders having fluid conducting ports at its opposite ends and the other having opposite end openings for alternately opening the adjacent cylinder end ports, a plunger reciprocable within said inner cylinder and dividing the same into opposed displacement chambers, means for reciprocating said plunger to draw fluent material into one of said chambers while discharging such material from the other during each stroke of the plunger and for relatively rotating said cylinders about their common axis at the end of each plunger stroke to reverse the plunger action during each succeeding stroke, and means for adjusting the stroke of said plunger to vary the quantity of said material delivered to and from said chambers during each reciprocation of the plunger.

9. In a fluent material feeder, a normally stationary outer cylinder having an inlet and an outlet port in each of its opposite ends, an inner cylinder rotatably confined within said outer cylinder but being fixed against longitudinal displacement therein and being provided with openings near its opposite ends adapted to alternately connect the inlet and outlet ports at the corresponding opposite ends of the outer cylinder with each other, a plunger reciprocable within said inner cylinder and dividing said cylinders into segregated displacement chambers each communicable only with the openings and ports at one end of the cylinders, and means for reciprocating said plunger and for rotating said inner cylinder near the end of each plunger stroke.

10. In a fluent material feeder, a normally stationary outer cylinder having an inlet and an outlet port in each of its opposite ends, an inner cylinder rotatably confined within said outer cylinder but being fixed against longitudinal displacement therein and being provided with openings near its opposite ends adapted to alternately connect the inlet and outlet ports at the corresponding opposite ends of the outer cylinder with each other, a plunger reciprocable within said inner cylinder and dividing said cylinders into segregated displacement chambers each communicable only with the openings and ports at one end of the cylinders, a bracket secured to said inner cylinder and having guideways thereon disposed parallel to the axis of said cylinder, rollers carried by said plunger and coacting with said guideways, and a lever for advancing said rollers along said guideways and for rotating said bracket and said inner cylinder near the end of each stroke of said plunger.

References Cited in the file of this patent
UNITED STATES PATENTS
2,107,987    Johnson _____ Feb. 8, 1938